(12) United States Patent
Nuiding

(10) Patent No.: US 7,913,515 B2
(45) Date of Patent: Mar. 29, 2011

(54) COMBINATION REFRIGERATING APPLIANCE AND EVAPORATORS FOR SAME

(75) Inventor: Wolfgang Nuiding, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 145 days.

(21) Appl. No.: 11/711,204

(22) Filed: Feb. 26, 2007

(65) Prior Publication Data

US 2007/0151288 A1    Jul. 5, 2007

Related U.S. Application Data

(63) Continuation of application No. 10/774,979, filed on Feb. 9, 2004, now Pat. No. 7,181,921, which is a continuation of application No. PCT/EP02/09014, filed on Aug. 12, 2002.

(30) Foreign Application Priority Data

Aug. 16, 2001   (DE) .................................. 101 40 005

(51) Int. Cl.
F25B 39/02    (2006.01)
F25B 49/00    (2006.01)
F25D 11/02    (2006.01)

(52) U.S. Cl. .................. 62/525; 62/526; 62/441; 62/198
(58) Field of Classification Search .................. 62/525, 62/526, 519, 504, 441, 198, 199
See application file for complete search history.

(56) References Cited

U.S. PATENT DOCUMENTS 5,553,457 A * 9/1996 Reznikov .......................... 62/81
7,181,921 B2 * 2/2007 Nuiding .......................... 62/198

FOREIGN PATENT DOCUMENTS

JP          2001167341 A  *  6/2001

* cited by examiner

*Primary Examiner* — Chen-Wen Jiang
(74) *Attorney, Agent, or Firm* — James E. Howard; Andre Pallapies

(57) ABSTRACT

Refrigerating appliance comprises at least one first, second and third refrigerating area for a low, medium or high storage temperature, whereby each refrigerating area has an evaporator. The refrigerating appliance also comprises a compressor, a refrigerant circuit for supplying compressed refrigerant to the evaporators and for returning expanded refrigerant to the compressor, and comprises at least one switching element for directing, as desired, the refrigerant through one of two branches of the refrigerant circuit. In the first branch, the evaporators of the first and the third refrigerating areas are connected in series. In the second branch, the evaporators of all three refrigerating areas are connected in series.

5 Claims, 2 Drawing Sheets

COMBINATION REFRIGERATING APPLIANCE AND EVAPORATORS FOR SAME

Figure 1:
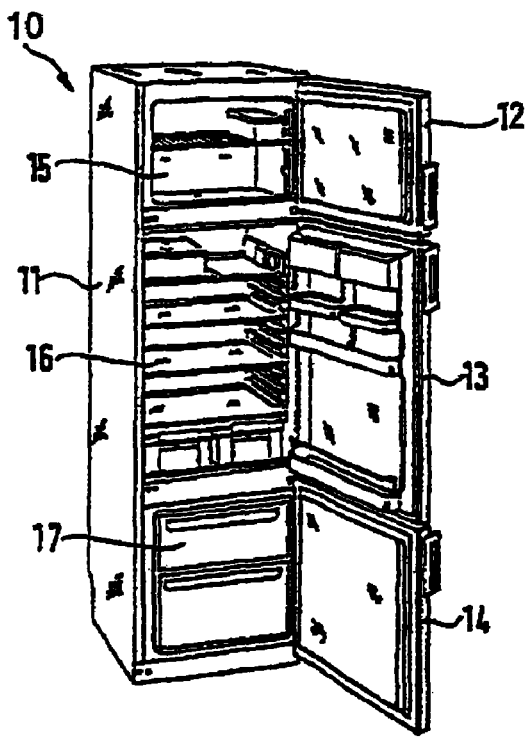

This application is a continuation, under 35 U.S.C. §120, of U.S. application Ser. No. 10/774,979, filed Feb. 9, 2004 and International Application No. PCT/EP02/09014, filed Aug. 12, 2002, which designated the United States; this application also claims the priority, under 35 U.S.C. §119, of German patent application No. 101 40 005.5, filed Aug. 16, 2001; the prior applications are herewith incorporated by reference in their entirety.

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to a refrigerating appliance with at least three refrigerating areas and evaporators for such a refrigerating appliance.

(2) Description of Related Art

Such a refrigerating appliance is disclosed in DE 4 242 776 A1.

This known refrigerating appliance has two valve units located in the refrigerant circuit and may be activated, in order to channel a refrigerant flow only through an evaporator dedicated to the first refrigerating area called a refrigeration compartment, or subsequently through an evaporator dedicated to the second refrigerating area described as standard refrigeration compartment and the refrigeration compartment evaporator or through a third evaporator dedicated to a refrigerating area described as freezer compartment and the refrigeration compartment evaporator. This means that the refrigerating appliance has three operating modes, a first in which only the refrigeration compartment is cooled, a second, in which the standard refrigeration compartment and the refrigeration compartment are jointly cooled, and a third, in which the freezer compartment and the refrigeration compartment are jointly cooled. The operating times may vary considerably within the three operating modes. Since the chilling department has a relative weak insulation and a small evaporator when compared to the other compartments, the operating time in the third operating mode may clearly exceed that of the second. This leads to a high overall operating time of the refrigerating machine of the refrigeration appliance and therefore to a high-energy consumption and to a lower temperature of the refrigeration compartments than necessary.

BRIEF SUMMARY OF THE INVENTION

The object of the invention is to define a refrigerating appliance and evaporators for a refrigerating appliance which enables a reduction of the operating time in the third operating mode and thereby prevent super-cooling the refrigeration compartment and reduce the energy consumption of the refrigerating appliance.

By connecting the evaporators of all three refrigerating areas sequentially in the second branch of the refrigerant circuit of the refrigerating appliance or by placing the connections on the evaporators so that a series connection of the three evaporators spans between two of the connections will be achieved that the third refrigerating area, the freezer compartment, will also be cooled when the refrigerant flow is routed over the second refrigerating area, the standard refrigeration compartment. The freezer compartment is therefore also continuously cooled when cooling the standard refrigeration compartment, so that the operating time required to adhere to the holding temperature of the freezer compartment is reduced in the third operating mode and therefore also the overall cooling period of the refrigeration compartment.

On the other hand, in order to now avoid excessive cooling of the freezer compartment at the expense of the refrigeration compartment, an effective provision may be made so that the second branch of the refrigerant circuit extends only over a section of the surface of the evaporator of the freezer compartment. The size of this section to obtain adequate cooling in all refrigerating areas at minimum power consumption depends on the sections of the individual evaporators and/or on their cooling capacities, as well as on the insulation quality of the individual temperature sectors. A generally effective rule for the size of this surface section can therefore not be defined; however, a suitable value is adjustable per experiment without any difficulty.

The evaporator of the third refrigerating area may be arranged in the second branch between the evaporators of the first and the second refrigerating area, so that the evaporated refrigerant partially flows through while the maximum cooling capacity per surface unit of the evaporator accumulates in the particular refrigerating area which is circulated by the refrigerant which is still in a liquid state.

Appropriately, the refrigerant circuit further has a third branch, which only contains the evaporator of the first refrigerating area. This third branch may be used when the cooling capacity, which reaches the first refrigerating area over the first or the second branch, is insufficient to maintain its holding temperature.

In this case, it may be appropriate that the first and the second branch expand over only a section each of the evaporator surface of the first refrigerating area. If this method assures that the cooling capacity which the first and the second branch in the first refrigerating area develop is somewhat insufficient to adhere their holding temperature, so that occasionally an operation of the third branch is required, a super-chilling of the first temperature section and the therefore accompanying dissipation of energy is therefore impossible.

BRIEF DESCRIPTION OF THE SEVERAL VIEWS OF THE DRAWING(S)

Figure 2:
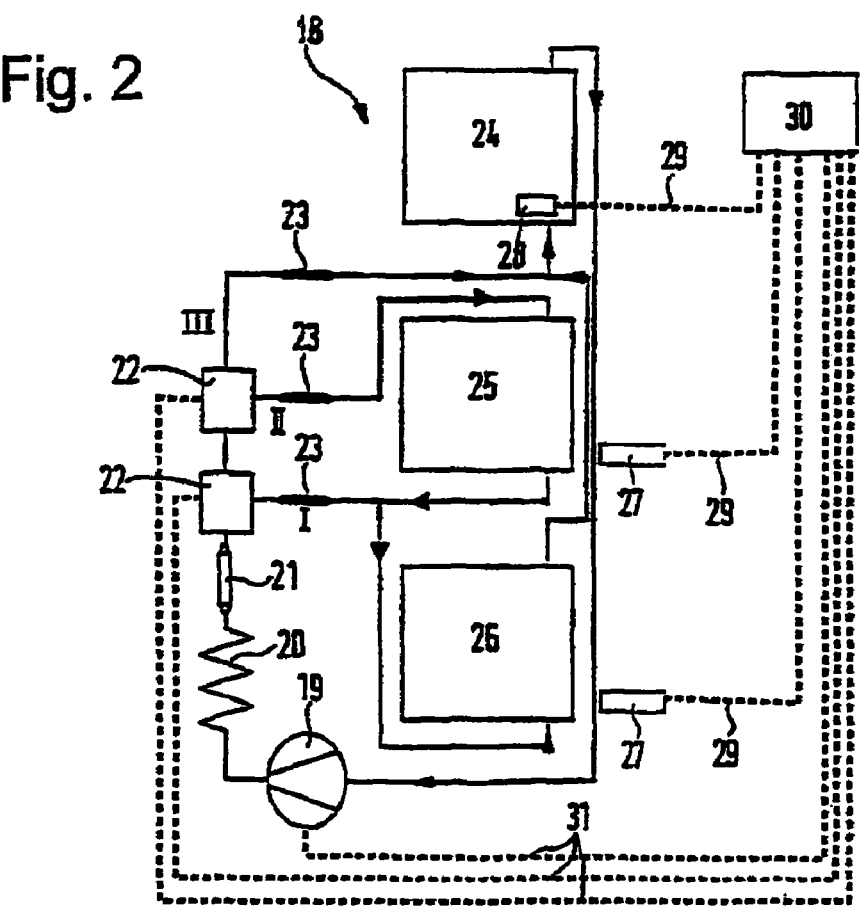
Figure 3:
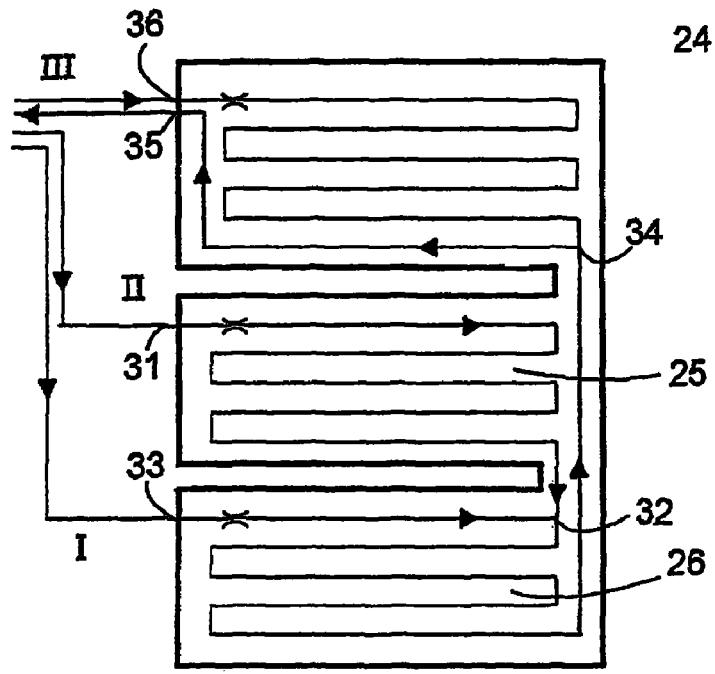
Figure 4:
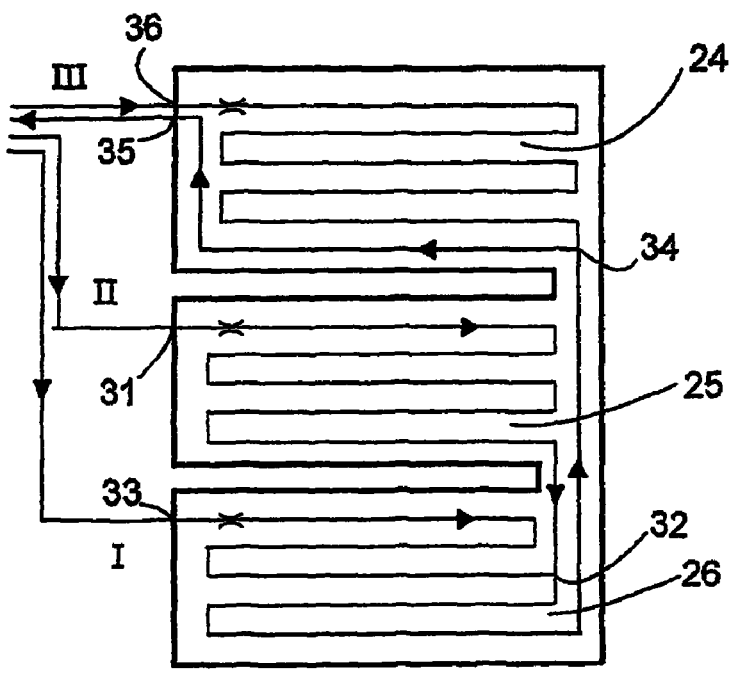

Additional characteristics and advantages of the invention result from the description of implementation examples in the following with reference to the added figures, in which:

FIG. 1 shows a perspective of a household refrigeration appliance with three temperature areas for which the submitted invention is applicable, FIG. 2 shows the refrigeration system of the refrigeration appliance in FIG. 1 in a simplified, schematic illustration, and FIGS. 3 and 4 show examples of evaporators for the refrigeration appliance corresponding with the invention.

DETAILED DESCRIPTION OF THE INVENTION

FIG. 1 shows a perspective of a household refrigeration appliance 10, whereof the heat-insulated housing 11 is provided with attached and doors 12-14 which open separately at its opening at the edge of the opening edge. Three compartments, which are superimposed and thermally separated by partitions in the interior of the housing 11, are lockable by the doors 12-14 which form the refrigerating areas 15-17 for various storage temperatures. The upper refrigerating area which may be locked by door 12 represents a refrigeration compartment, centre section 16, which is assigned to the door 13, serves as standard refrigeration compartment, while the section 17 located below is designed as freezer compartment and can be locked with the door 14. The various storage temperatures in the individual sections are maintained with the assistance of the refrigeration system described in the following.

The refrigeration system 18 illustrated schematically in FIG. 1 has a refrigerant compressor 19 behind which a condenser 20 is located on the pressure side. A dehumidifier cartridge 21 connects to the outlet of the condenser 20, whose outlet is connected with the inlet of a first valve unit 22, which is designed as an electromagnetically operated 3/2 way valve. A first outlet of this valve unit is connected to an inlet of an evaporator 26, which is located in the freezer compartment 17 of the refrigeration appliance. A second outlet of the valve unit 22 is connected to the inlet of a similar second valve unit 22', whose two outlets are always connected with an inlet of an evaporator 25 of the standard refrigeration compartment 16 and/or an evaporator 24 of refrigeration compartment 15. A spirally wound restrictor 23 which is designed as capillary tube is connected in series between the inlet of one of the evaporators 24, 25, 26 and the assigned outlet of a valve unit 22.

The outlet of the evaporator 25 is connected by a connecting line between the inlet of the evaporator 26 and the restrictor 23, which is assigned to it, the outlet of the evaporator 26 is connected in an analog mode with the inlet of the evaporator 24.

The refrigerant circuit therefore has three branches, which are defined as FIG. 1-111. All three branches pass through the evaporator 24, which is assigned, to the refrigeration compartment 15. The branch in guides the refrigerant initially through the evaporator 26 of the freezer compartment 17; branch 111 represents a series connection of all three evaporators in sequence 25, 26, 24.

A temperature sensor 27, 27' and 28 is assigned to each compartment 15, 16, 17, whereby, as illustrated schematically in the figure, this may be an optionally installed air temperature sensor 27, 27' in the case of the refrigeration compartment 16 and freezer compartment 17, while the sensor 28 is assigned to the surface of the evaporator 24 in the case of the refrigeration compartment 14.

A regulator assembly 30 controls the operation of the compressor 19, as well as the switch position of 22, 22' by means of measuring signals transmitted over the signal lines 29 by the sensors 27, 27', 28.

The regulator assembly 30 moves the refrigerant flow through branch II by means of the measuring signal of the air temperature sensor 27 of the standard refrigeration compartment 16, so that the temperature in the standard refrigeration compartment 16 is at a value set by the user. When a refrigerant flows through this circuit, the freezer compartment 17 and the refrigeration compartment 15 are also cooled in addition to the standard refrigeration compartment 16. The cooling capacities of the individual evaporators. 24, 25, 26 are calculated so that the cooling capacity of the evaporators 24, 26 are insufficient to cover the cooling requirement of its compartments 15, 17 during the thermostat-controlled operation of branch II by means of the measuring signal of sensor 27.

When one of the temperature sensors 27, 28 detects a cooling requirement, however, the sensor 27 does not, the regulator assembly 30 will always operate the refrigeration system in the switch position of that for branch 1 or 111.

When the air temperature sensor 27 of standard cooling compartment 16 and one of the air temperature sensors 28, 27' simultaneously detect a cooling requirement, arrangements may be made so that the regulator assembly 30 ignores the detected result of the air temperature sensor 28 or 27' until the air temperature sensor 27 no longer reports a cooling requirement. This means that all three compartments are cooled until the standard refrigeration compartment 16 has reached the holding temperature and subsequently continues to cool over one of the branches 1, 111 depending on the requirement. Alternative arrangements may be made so that the regulator assembly 30 also considers the deviation of the temperature recorded by the air temperature sensor 28 or 27' of the holding temperature in such an event for the appropriate compartment 15 or 17 and that it changes occasionally to branch I or 111, if the deviation of the measured temperature is greater than that of the air temperature sensor 27 from the measured holding temperature for the appropriate compartment than depending on the fact if the excessive temperature is present in the freezer compartment 17 or in the freezer compartment 15, and subsequently again activates the branch when the excessive temperature deviation has been eliminated.

FIG. 3 shows a first example of an evaporator in a schematic illustration for the refrigerating appliance described in reference to FIGS. 1 and 2. The evaporator contains the abovementioned evaporators 24, 25, 26, which are illustrated here assembled on a single support plate, however, which may also be designed as separate components.

The branch II enters the evaporator 25 of the freezer compartment at an inlet 31 and meanders essentially over its entire surface to a junction 32 on the evaporator 26 of the freezer compartment. The line coming from the evaporator 25 joins with branch I at this point, which enters the evaporator 26 over an entry connection 33 and from there essentially progresses over the entire surface of the evaporator 26. The line finally reaches a connecting point 34 on the evaporator 24 of the refrigeration compartment and from there progresses to an outlet 35 over which the refrigerant is returned to the compressor 19.

The line between the connecting point 34 and the outlet 35 cools only a part of the surface of the evaporator 24, a line, which progresses from an inlet 36 of the evaporator 24 to the connecting point 34 and belongs to branch III, uses the remaining surface. Through suitable selection of the position of the connecting point 34 on the evaporator 24, it may be defined how large the part of the surface of the evaporator 24 is which is also a part of the branches I and II and therefore is also cooled along with the standard refrigeration compartment 16 and freezer compartment 17. The cooling capacity in the refrigeration compartment 15 and the hazard of supercooling of the refrigeration compartment may be limited by this design method during the operation of branches I and II.

The evaporators in FIG. 4 differ from those in FIG. 3 by the position of the first connecting point 32. In the case of FIG. 4, this is arranged at about half the length of the refrigerant line of the evaporators 26 so that the evaporator 26 of the freezer compartment is only cooled over its entire surface during the operation of branch I, however, only at about half during the operation of branch II. The same deliberations apply here as illustrated in reference to FIG. 3 for the evaporator 24 of the refrigeration compartment: The cooling capacity of the evaporator 26 may be limited during the operation of branch II by a suitable positioning of the connecting point 32 and thus avoid super-cooling of the freezer compartment during the operation of circuit II. Such a hazard may otherwise develop when the refrigerating appliance is operated at low ambient temperatures.

The invention claimed is:

1. A refrigerating appliance comprising:
   a lower temperature refrigerating area;
   an average temperature refrigerating area;
   a higher temperature refrigerating area;
   a plurality of evaporators, each of the evaporators being associated with a respective one of the lower, average, and higher temperature refrigerating areas;
   a compressor;
   a refrigerant circuit to supply compressed refrigerant from the compressor to the evaporators of the lower, average, and higher temperature refrigerating areas and to return expanded refrigerant to the compressor, the refrigerant circuit including one branch along which compressed refrigerant is supplied from the compressor to the evaporators of the lower, average, and higher temperature refrigerating areas and expanded refrigerant is returned to the compressor and another branch along which compressed refrigerant is supplied from the compressor to the evaporators of the lower, average, and higher temperature refrigerating areas and expanded refrigerant is returned to the compressor, the one branch of the refrigerant circuit being configured such that compressed refrigerant flows through one predetermined extent of an evaporator of a respective one of the lower, average, and higher temperature refrigerating areas and the other branch of the refrigerant circuit being configured such that compressed refrigerant flows through a reduced extent of the evaporator of the respective one refrigerating area that is less than the one predetermined extent of the evaporator of the respective one refrigerating area, whereupon the cooling capacity of the respective one refrigerating area is less when compressed refrigerant flows to the evaporator of the respective one refrigerating area via the other branch of the refrigerant circuit than when compressed refrigerant flows to the evaporator of the respective one refrigerating area via the one branch of the refrigerant circuit; and
   a switching element to switch the circulation of refrigerant between the one branch of the refrigerant circuit and the other branch of the refrigerant circuit.

2. The refrigerating appliance according to claim 1, wherein the evaporator of the respective one refrigerating area includes an exit connecting point at which refrigerant exits the evaporator, a first entry point at which refrigerant enters the evaporator when the evaporator is supplied with refrigerant via the one branch of the refrigerant circuit, and a second entry point at which refrigerant enters the evaporator when the evaporator is supplied with refrigerant via the other branch of the refrigerant circuit, the second entry point being downstream of the first entry point relative to the flow of refrigerant in the evaporator.

3. The refrigerating appliance according to claim 2, wherein the refrigerant circuit includes a further branch including only the evaporator of the higher temperature refrigerating area.

4. An evaporation circuit for a refrigerating appliance, the evaporation circuit comprising:
   at least three evaporators, each evaporator being associated with a respective one of a lower temperature refrigerating area, an average temperature refrigerating area, and a higher temperature refrigerating area of a refrigerating appliance;
   at least three connections to the evaporators; and
   a series connection of the evaporators having the connections, the series connection spanning between two of the connections, and the evaporators being supplied with refrigerant via a refrigerant circuit operable to supply compressed refrigerant from a compressor to the evaporators of the lower, average, and higher temperature refrigerating areas and to return expanded refrigerant to the compressor, the refrigerant circuit including one branch along which compressed refrigerant is supplied from the compressor to the evaporators of the lower, average, and higher temperature refrigerating areas and expanded refrigerant is returned to the compressor and another branch along which compressed refrigerant is supplied from the compressor to the evaporators of the lower, average, and higher temperature refrigerating areas and expanded refrigerant is returned to the compressor, the one branch of the refrigerant circuit being configured such that compressed refrigerant flows through one predetermined extent of an evaporator of a respective one of the lower, average, and higher temperature refrigerating areas and the other branch of the refrigerant circuit being configured such that compressed refrigerant flows through a reduced extent of the evaporator of the respective one refrigerating area that is less than the one predetermined extent of the evaporator of the respective one refrigerating area, whereupon the cooling capacity of the respective one refrigerating area is less when compressed refrigerant flows to the evaporator of the respective one refrigerating area via the other branch of the refrigerant circuit than when compressed refrigerant flows to the evaporator of the respective one refrigerating area via the one branch of the refrigerant circuit.

5. The evaporation circuit according to claim 4 and further comprising a switching element to switch the circulation of refrigerant between the one branch of the refrigerant circuit and the other branch of the refrigerant circuit.

* * * * *